United States Patent [19]

Soma et al.

[11] Patent Number: 4,747,984

[45] Date of Patent: May 31, 1988

[54] PRODUCTION OF SILICON NITRIDE SINTERED BODY

[75] Inventors: Takao Soma, Nagoya; Tomonori Takahashi, Chita, both of Japan

[73] Assignee: NGK Insulators, Ltd., Japan

[21] Appl. No.: 932,204

[22] Filed: Nov. 18, 1986

[30] Foreign Application Priority Data

Nov. 18, 1985 [JP] Japan .................................. 60-256805

[51] Int. Cl.$^4$ .............................................. C04B 35/64
[52] U.S. Cl. .......................................... 264/65; 264/85
[58] Field of Search ..................................... 264/65, 85

[56] References Cited

U.S. PATENT DOCUMENTS 4,383,957  5/1983  Yamakawa et al. ................... 264/65
4,511,525  4/1985  Tsuge et al. ........................... 264/65

FOREIGN PATENT DOCUMENTS 58-49509  11/1983  Japan .
59-111981  6/1984  Japan ..................................... 264/65

Primary Examiner—James Derrington
Attorney, Agent, or Firm—Parkhurst & Oliff

[57] ABSTRACT

A process for manufacturing a silicon nitride sintered body comprises molding a mixed powder of a silicon nitride starting material and a sintering aid and firing a thus obtained molding. The firing is carried out in an $N_2$ atmosphere or a mixed atmosphere of $N_2$ and an inert gas to which $CO_2$ or a mixed gas of $CO_2$ and CO is added. Thereby, an $O_2$ partial pressure is increased to restrain the evaporation of $SiO_2$ and nitriding of $SiO_2$ during the firing. The silicon nitride sintered body suffers almost no deterioration of the fired surface resulting from the evaporation of $SiO_2$ and the nitriding of $SiO_2$, and exhibits substantially equal four point bending strength and oxidation resistance with respect to the fired surface and the inside thereof.

4 Claims, No Drawings

PRODUCTION OF SILICON NITRIDE SINTERED BODY

BACKGROUND OF THE INVENTION (1) Field of the Invention

The present invention relates to a process suitable for manufacturing a silicon nitride sintered body.

(2) Related Art Statement

According to a conventional process for producing a silicon nitride sintered body, a sintering aid which forms a liquid phase in grain boundaries, such as $Y_2O_3$, $Al_2O_3$, MgO, etc., is added to a raw material powder of silicon nitride, and a molding obtained from a resulting mixture is fired in an $N_2$ atmosphere or a mixed atmosphere of $N_2$ and an inert gas or in such an atmosphere under pressure. For instance, Japanese Patent Publication No. 58-49,509 discloses a process for performing firing in an $N_2$ atmosphere under pressure or in a mixed atmosphere of $N_2$ and an inert gas under pressure.

In these cases, a carbonaceous heater or a firing jig is ordinarily used, and the atmosphere is an $N_2$ atmosphere or a mixed atmosphere with a low $O_2$ partial pressure in which $O_2$ contained as an impurity in $N_2$ gas is reduced.

By the way, $SiO_2$ which is inherently contained in an oxide additive and a silicon nitride raw material and serves as a sintering aid forms glass in grain boundaries through reaction and effectively performs densification of a structure and formation of a fine structure. However, in the above-mentioned conventional processes, when the silicon nitride molding is fired in $N_2$ atmosphere or $N_2$ pressurizing atmosphere with a low $O_2$ partial pressure, as shown in the following expressions (1) and (2), the oxide additive and $SiO_2$ evaporate from the glass phase, or are nitrided. Thereby, the ratio between O and N in the glass phase varies so that the composition of the glass phase at the grain boundary changes.

Evaporation reaction of $SiO_2$: $SiO_2 \rightleftarrows SiO + \frac{1}{2}O_2$    (1)

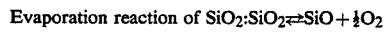

Nitriding reaction of
$SiO_2$: $3SiO_2 + 2N_2 \rightleftarrows Si_3N_4 + 3O_2$    (2)

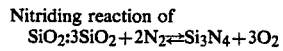

For this reason, the conventional process has the drawback that a sufficiently densified silicon nitride cannot be obtained or difference occurs in fine structure between the surface at which evaporation easily takes place and the inside portion at which the evaporation is difficult, thereby deteriorating the properties of the fired face.

SUMMARY OF THE INVENTION

It is therefore an object of the present invention to eliminate the above-mentioned problems and to provide a process for producing a silicon nitride sintered body which suffers almost no deterioration of a fired surface resulting from the evaporation and nitriding reaction of $SiO_2$.

According to the present invention, there is a provision of a process for producing a silicon nitride sintered body, which comprises molding a mixed powder of a silicon nitride starting material powder and a sintering aid, and firing a resulting molding in an $N_2$ atmosphere or a mixed atmosphere of $N_2$ and an inert gas in which $CO_2$ or a mixed gas of $CO_2$ and CO is added so that an $O_2$ partial pressure is increased to restrain the evaporation of $SiO_2$ and the nitriding of $SiO_2$ when the molding is fired.

By so doing, $SiO_2$ is prevented from evaporating and being nitrided by increasing the partial pressure of $O_2$ in the $N_2$ atmosphere or the mixed atmosphere of $N_2$ and the inert gas.

These and other objects, features and advantages of the present invention will be well understood from the following description of the invention.

DETAILED DESCRIPTION OF THE INVENTION

A preferable $O_2$ partial pressure can be selectively determined depending upon an equilibrium $O_2$ partial pressure, an evaporation speed, and a nitriding speed in the evaporation reaction of $SiO_2$ and the nitriding reaction of $SiO_2$, and a firing time at a firing temperature.

As a way of increasing this $O_2$ partial pressure, $CO_2$ or a mixed gas of $CO_2$ and CO is further mixed into the $N_2$ atmosphere or the mixed atmosphere of $N_2$ and the inert gas. Thereby, the $O_2$ partial pressure is increased by utilizing the equilibrium $O_2$ partial pressure resulting from the $CO_2$ dissociation reaction shown by the following expressions (3) and (4).

Equilibrium reactions of $CO_2$:

$$CO_2 \rightleftarrows CO + \tfrac{1}{2}O_2 \qquad (3)$$

$$CO_2 \rightleftarrows C + O_2 \qquad (4)$$

The reason why $CO_2$ or the mixed gas of $CO_2$ or CO is selected as an addition gas to enhance the $O_2$ partial pressure in the present invention is that by controlling the $O_2$ partial pressure through the $CO_2$ dissociation reactions, damages of a carbonaceous heater, a jig, etc. frequently used for firing the silicon nitride sinterable body are reduced and that a range of the $O_2$ partial pressure is appropriately selected and easy to be controlled.

The reason why 0.001% or more of $CO_2$ is favorably mixed into the $N_2$ atmosphere or the mixed atmosphere of $N_2$ and the inert gas is that no effect is recognized in the case of less than 0.001% because less than 0.001% becomes lower than the content of impurities usually contained in $N_2$ gas.

On the other hand, if the mixing amount of $CO_2$ is too much, the $O_2$ partial pressure becomes too high so that the oxidation reaction of $Si_3N_4$ unfavorably becomes conspicuous. The reason why the total pressure of the $N_2$ atmosphere or the mixed atmosphere is favorably set at not less than 1 atm. is because the oxidation reaction of $Si_3N_4$ can be restrained and firing can be done by increasing the $N_2$ partial pressure even when the $O_2$ partial pressure is high. Thus, the evaporation of the $SiO_2$ can be effectively restrained.

In summarizing the above, the $O_2$ partial pressure is raised to restrain the evaporation of $SiO_2$. The $O_2$ partial pressure is increased and balanced with the $N_2$ partial pressure to restrain the nitriding of $SiO_2$. Further, the $N_2$ partial pressure is increased and balanced with the $O_2$ partial pressure to restrain the oxidation of $Si_3N_4$.

Further, when CO is mixed into the firing atmosphere together with $CO_2$, a CO formation reaction shown in the following formula (5) is made difficult to take place, and a consumed amount of carbon (C) is decreased to reduce damages of the carbonaceous heater, jig, etc.

frequently used in the firing of the silicon nitride sinterable body.

CO formation reaction:

$$CO_2 + C \rightarrow 2CO \qquad (5)$$

It is preferable that a mixing rate of CO is greater than that of $CO_2$. However, if CO is in a pressure higher than an equilibrium partial pressure of CO in the reaction shown by the formula (5), a formation reaction of $CO_2$ and C reverse to the reaction shown in the formula (5) takes place so that a produced C deposits on the silicon nitride sintered body or reacts with $SiO_2$ in the silicon nitride sinterable body. Thus, the pressure higher than the CO equilibrium partial pressure is unfavorable.

In addition, in order to reduce damages of the carbonaceous heater, jig, etc. in the firing furnace for the silicon nitride sinterable body and control the $O_2$ partial pressure in the firing furnace to an appropriate range, it may be that an $N_2$ gas or a mixed gas of $N_2$ and an inert gas which contains CO and $CO_2$ is prepared by passing $N_2$ gas or a mixed gas of $N_2$ and the inert gas which is mixed with gases of $O_2$, $H_2O$, air, $CO_2$, etc. through a heater placing a consumable carbon source therein, and is then introduced into the firing furnace for the silicon nitride sinterable body. As a matter of course, it may be that a gas containing CO and $CO_2$ is prepared by passing a gas comprising $O_2$, $H_2O$, air, $CO_2$, etc. through the heater placing the carbon source therein, and mixed into an $N_2$ gas or a mixed gas of $N_2$ and an inert gas, which is then introduced into the silicon nitride sinterable body-firing furnace.

Moreover, in order to reduce damages of the carbonaceous heater, jig, etc. in the firing furnace for the silicon nitride sinterable body and control the $O_2$ partial pressure in the firing furnace to the appropriate range, it may be that an $N_2$ gas or a mixed gas of $N_2$ and an inert gas containing CO and $CO_2$ is prepared by reacting an $N_2$ gas or a mixed gas of $N_2$ and the inert gas which contains gases of $O_2$, $H_2O$, air, $CO_2$, etc. with a consumable carbon source at an initial stage location of a gas introducing path of the firing furnace, and then introduced into a certain location of the heater of the jig in the firing furnace.

The process for manufacturing the silicon nitride sintered body according to the present invention will be explained in more detail.

First, the silicon nitride powdery starting material is prepared. The silicon nitride powdery starting material is composed of a formulated powder of a silicon nitride raw material powder and a sintering aid. $Y_2O_3$, MgO, $Al_2O_3$, etc. is added as a sintering aid as it is or in a form of an aqueous solution.

Next, the above silicon nitride starting material powder is crushed and mixed by means of a mill using media. The mills of a wet type and a dry type may be both used. For instance, a ball mill, an attrition mill, a vibration mill, etc. may be used. Then, a thus obtained molding powder is molded by a dry type press, an injection molding, a slip casting, etc., thereby, obtaining a desired molding.

The thus obtained molding is fired in an $N_2$ atmosphere or a mixed atmosphere of $N_2$ and an inert gas into which $CO_2$ or a mixed gas of $CO_2$ and CO is added. The firing temperature is preferably in a temperature range from 1,600° C. to 2,000° C. The addition amount of $CO_2$ to $N_2$ is preferably in a range not less than 0.001%. It is preferable that the total pressure of the $N_2$ atmosphere or the mixed atmosphere is not less than 1 atm. The desired silicon nitride sintered body can be obtained by the above-mentioned process.

The present invention will be explained below in more detail based on the following examples, which are merely given in illustration thereof, but should never be interpreted to limit the scope of the invention.

EXAMPLE 1

A preparation powder was formulated by adding a sintering aid to a silicon nitride powdery starting material of 97.1% by weight in purity with a content of oxygen being 1.5% by weight at a rate shown in Table 1. After the preparation powder was mixed and crushed by means of a water wet type ball mill, the powder was dried and granulated, thereby obtaining a molding powder. Then, the molding powder was preliminarily molded, and molded by a hydrostatic press under a pressure of 3 ton/cm², thereby preparing a planar molding of 60×60×6 mm. Such moldings were fired in an atmosphere and at a temperature given in Table 1, thereby obtaining silicon nitride sintered body Nos. 1–12 according to the manufacturing process of the present invention. On the other hand, such moldings were fired in an atmosphere outside of the restricted range of the manufacturing process according to the present invention given in Table 1, thereby obtaining silicon nitride sintered body Nos. 13–24 as comparative examples. The firing atmosphere given in Table 1 were controlled by supplying $N_2$, $CO_2$ and CO raw gases to a firing furnace at rates given in Table 1.

With respect to the silicon nitride sintered body Nos. 1–24, Table 1 shows a bulk density, an oxygen content, a four point bending strength when a fired face or an inside worked face was employed as a tensile face, and increased amounts of oxidation per unit area in the fired face and the inside worked face when heated at 1,200° C. in air for 100 hours. The bulk density and the four point bending strength were measured according to an Archimedes method and "a fine ceramics bending strength testing method" of JIS R-1601, respectively, with respect to a fired face and an inside worked face worked as tensile face at a depth deeper than 1 mm from the surface. An increased amount of oxidation was determined from a weight increase and a surface area with respect to a sample having the whole surface fired and a sample having the whole surface which was an inside worked face worked at a depth not shallower than 1 mm from the surface after being heated in air.

TABLE 1

| | Addition composition (wt %) | Firing conditions Atmosphere | | | | | | Four point bending strength (MPa) | | Increased amount of oxidation (mg/cm²) | |
| --- | --- | --- | --- | --- | --- | --- | --- | --- | --- | --- | --- | --- |
| No. | | $CO_2$ (%) | CO (%) | Balance (%) | Total pressure (atm) | Temperature (°C.) | Bulk density (g/cm³) | Oxygen content (wt %) | Fired face | Inside worked face | Fired face | Inside worked face |

Present

TABLE 1-continued

| | | Firing conditions | | | | | | Four point bending strength (MPa) | | Increased amount of oxidation (mg/cm$^2$) | |
|---|---|---|---|---|---|---|---|---|---|---|---|---|
| | | Atmosphere | | | | | | | | | |
| No. | Addition composition (wt %) | CO$_2$ (%) | CO (%) | Balance (%) | Total pressure (atm) | Temperature (°C.) | Bulk density (g/cm$^3$) | Oxygen content (wt %) | Fired face | Inside worked face | Fired face | Inside worked face |
| invention | | | | | | | | | | | | |
| 1 | MgO(5) | 0.001 | 0 | N$_2$ | 1 | 1750 | 3.18 | 4.2 | 680 | 710 | 0.8 | 0.8 |
| 2 | MgO(3) | 0.1 | 0 | N$_2$ | 20 | 1900 | 3.20 | 3.3 | 820 | 880 | 0.6 | 0.6 |
| 3 | Al$_2$O$_3$(5) | 10 | 1 | N$_2$ | 10 | 1850 | 3.16 | 3.8 | 650 | 700 | 0.1 | 0.1 |
| 4 | Al$_2$O$_3$(3) | 20 | 2 | N$_2$ | 50 | 1900 | 3.15 | 3.0 | 720 | 800 | 0.1 | 0.1 |
| 5 | Y$_2$O$_3$(5) | 0.1 | 0 | N$_2$ | 10 | 1900 | 3.26 | 3.4 | 870 | 920 | 0.2 | 0.2 |
| 6 | Y$_2$O$_3$(3) | 1 | 0.2 | N$_2$ | 100 | 2000 | 3.24 | 2.8 | 900 | 950 | 0.2 | 0.2 |
| 7 | Y$_2$O$_3$(5), MgO(5) | 0.01 | 0 | N$_2$ | 1 | 1700 | 3.26 | 5.3 | 820 | 860 | 0.3 | 0.3 |
| 8 | Y$_2$O$_3$(3), MgO(3) | 1.5 | 0.1 | N$_2$ | 10 | 1850 | 3.28 | 4.4 | 970 | 1020 | 0.2 | 0.2 |
| 9 | Y$_2$O$_3$(3), MgO(3) | 50 | 0 | N$_2$(50), Ar(50) | 50 | 1900 | 3.29 | 4.2 | 900 | 990 | 0.2 | 0.2 |
| 10 | Y$_2$O$_3$(5), Al$_2$O$_3$(5) | 0.001 | 0 | N$_2$ | 1 | 1750 | 3.28 | 5.2 | 750 | 790 | 0.4 | 0.4 |
| 11 | Y$_2$O$_3$(3), Al$_2$O$_3$(3) | 0.1 | 0.01 | N$_2$ | 300 | 1950 | 3.25 | 4.3 | 820 | 900 | 0.3 | 0.2 |
| 12 | Y$_2$O$_3$(3), Al$_2$O$_3$(3) | 0.01 | 0 | N$_2$(50), Ar(50) | 10 | 1850 | 3.24 | 4.5 | 830 | 840 | 0.2 | 0.2 |
| Comparative example | | | | | | | | | | | | |
| 13 | MgO(5) | 0 | 0 | N$_2$ | 1 | 1750 | 3.10 | 3.3 | 480 | 650 | 1.8 | 1.2 |
| 14 | MgO(3) | 0 | 0 | N$_2$ | 20 | 1900 | 3.08 | 2.4 | 420 | 550 | 2.0 | 1.9 |
| 15 | Al$_2$O$_3$(5) | 0 | 0 | N$_2$ | 10 | 1850 | 3.10 | 2.9 | 400 | 550 | 0.7 | 0.2 |
| 16 | Al$_2$O$_3$(3) | 0 | 0 | N$_2$ | 50 | 1900 | 3.08 | 2.4 | 380 | 560 | 0.7 | 0.3 |
| 17 | Y$_2$O$_3$(5) | 0 | 0 | N$_2$ | 10 | 1900 | 3.16 | 2.6 | 420 | 620 | 0.9 | 0.5 |
| 18 | Y$_2$O$_3$(3) | 0 | 0 | N$_2$ | 100 | 2000 | 3.07 | 2.0 | 360 | 480 | 1.0 | 1.3 |
| 19 | Y$_2$O$_3$(5), MgO(5) | 0 | 0 | N$_2$ | 1 | 1700 | 3.17 | 4.2 | 580 | 630 | 0.5 | 0.3 |
| 20 | Y$_2$O$_3$(3), MgO(3) | 0 | 0 | N$_2$ | 10 | 1850 | 3.19 | 3.4 | 560 | 680 | 0.9 | 0.2 |
| 21 | Y$_2$O$_3$(3), MgO(3) | 0 | 0 | N$_2$(50), Ar(50) | 50 | 1900 | 3.20 | 2.9 | 510 | 700 | 0.6 | 1.2 |
| 22 | Y$_2$O$_3$(5), Al$_2$O$_3$(5) | 0 | 0 | N$_2$ | 1 | 1750 | 3.22 | 4.0 | 470 | 700 | 0.8 | 0.6 |
| 23 | Y$_2$O$_3$(3), Al$_2$O$_3$(3) | 0 | 0 | N$_2$ | 300 | 1950 | 3.19 | 2.8 | 480 | 670 | 1.1 | 0.8 |
| 24 | Y$_2$O$_3$(3), Al$_2$O$_3$(3) | 0 | 0 | N$_2$(50), Ar(50) | 10 | 1850 | 3.19 | 2.9 | 510 | 650 | 0.9 | 0.4 |

As evident from Table 1, as compared with the conventional processes, the sintered bodies having the same composition being denser and exhibiting the equal four point bending strength and the oxidation resistance both with respect to the fired surface and inside can be obtained by firing in the N$_2$ gas atmosphere or the mixed atmosphere of N$_2$ and an inert gas to which CO$_2$ or a mixed gas of CO$_2$ and CO is added.

The same moldings as in Sample No. 5 of the present invention in Example 1 were fired at 1900° C. in respective atmospheres containing CO and CO$_2$ shown in Table 2. As a result, sintered bodies each having approximately the same four point bending strength and increased amount of oxidation as in Sample No. 5 of the present invention with respect to the fired face and the inside worked face were obtained. At that time, a carbon pellet of 20 mm in diameter and 10 mm in height was placed and fired together with the silicon nitride sinterable body in the firing furnace. Reduced weights of carbon pellets due to the firing were shown in Table 2.

As understood from Table 2, the weight reducing of the carbon pellet in the firing is reduced by mixing CO to the firing atmosphere. That is, the damages of the carbonaceous heater or jig in the firing furnace can be reduced by mixing of CO.

TABLE 2

| | No. | Firing atmosphere | | | | Reduced weight of carbon pellet |
|---|---|---|---|---|---|---|
| | | CO$_2$ (%) | CO (%) | Balance (%) | Total pressure (atm) | |
| Present invention | 25 | 0.1 | 0 | N$_2$ | 10 | 0.5 |
| Present invention | 26 | 0.1 | 0.05 | N$_2$ | 10 | 0.4 |
| Present invention | 27 | 0.1 | 0.1 | N$_2$ | 10 | 0.15 |
| Present invention | 28 | 0.1 | 1 | N$_2$ | 10 | 0.05 |

As obvious from the foregoing explanation, according to the silicon nitride-manufacturing process of the present invention, the silicon nitride sintered body which suffers almost no deterioration of the fired surface resulting from the evaporation and nitriding reaction of SiO$_2$, is dense, and exhibits the equal four bending strength and oxidation resistance with respect to the fired surface and the inside can be obtained by firing the molding in the N$_2$ atmosphere or the mixed atmosphere of N$_2$ and an inert gas to which CO$_2$ or a mixed gas of CO$_2$ and CO is added.

While there has been described preferred examples of the invention, obvious modifications and variations are possible in light of the above teachings. It is therefore to be understood that within the scope of the appended claims, the invention may be practiced otherwise than as specifically described.

What is claimed is:

1. A process for manufacturing a silicon nitride sintered body comprising:

forming a mold comprising a mixture of a silicon nitride starting material powder and a sintering aid; and firing said mold in at least one atmosphere selected from the group consisting of $N_2$ to which at least 0.001% of $CO_2$ is added, a mixture of $N_2$ and an inert gas to which at least 0.001% of $CO_2$ is added, and a mixture of $N_2$ and an inert gas to which a mixed gas of at least 0.001% of $CO_2$ and CO are added, wherein said at least one atmosphere contains a sufficient oxygen partial pressure to restrain the evaporation and nitriding of $SiO_2$ within said mold during firing.

2. The process of claim 1, wherein the total pressure of the $N_2$ atmosphere and the mixed atmosphere of $N_2$ and the inert gas is not less than 1 atm.

3. The process of claim 1, wherein the mixed gas of $CO_2$ and CO is mixed into at least one atmosphere selected from the group consisting of $N_2$ and a mixture of $N_2$ and an inert gas, such that a mixing rate of CO is greater than a mixing rate of $CO_2$.

4. The process of claim 1, wherein a partial pressure of the mixed CO in the firing atmosphere is lower than an equilibrium CO partial pressure in the following formula:

$$CO_2 + C \rightarrow CO.$$

* * * * *